United States Patent [19]

Garnier

[11] 4,157,753
[45] Jun. 12, 1979

[54] CONVEYOR PLANT
[75] Inventor: Patrice Garnier, Barentin, France
[73] Assignee: Cidelcem, Paris, France
[21] Appl. No.: 840,166
[22] Filed: Oct. 6, 1977
[30] Foreign Application Priority Data
Oct. 15, 1976 [FR] France .................. 76 31086
Oct. 15, 1976 [FR] France .................. 76 31087
[51] Int. Cl.² .......................................... B65G 43/02
[52] U.S. Cl. .................. 198/856; 186/1 R; 198/793; 198/861
[58] Field of Search ............... 198/793, 797, 854, 855, 198/856, 860, 861, 862, 950; 186/1 R, 1 A, 1 AC, 1 B, 1 C, 1 D

[56] References Cited
U.S. PATENT DOCUMENTS

| | | | |
|---|---|---|---|
| 1,528,133 | 3/1925 | Ross | 198/861 |
| 2,491,899 | 12/1949 | Mercier | 198/861 |
| 2,666,519 | 1/1954 | Boots | 186/1 R |
| 2,764,276 | 9/1956 | Ruppe | 198/860 |
| 2,932,860 | 4/1960 | Barth | 186/1 R |
| 3,040,874 | 6/1962 | Lyman | 198/793 |
| 3,129,807 | 4/1964 | Richter et al. | 198/856 |
| 3,521,738 | 7/1970 | Coleman | 198/793 |
| 3,825,108 | 7/1974 | Stone | 198/860 |
| 3,926,489 | 12/1975 | Futch | 186/1 R |
| 4,048,984 | 9/1977 | Eberhardt | 198/793 |

Primary Examiner—Robert B. Reeves
Assistant Examiner—Richard K. Thomson
Attorney, Agent, or Firm—Michael J. Striker

[57] ABSTRACT

In a conveyor plant for equipping both sides of a wall or partition in which two spaced apertures are formed to permit the free passage of the movable component elements of the conveyor plant, a pair of casings are each adapted to be clamped by means of jaws against one of the adjacent vertical edges of the aperture; a pair of flat longitudinal members are disposed against the wall and secured to the two casings at their ends, and a safety device responsive to any interference with said apertures is provided for actuating the knock-off motion of the plant by means of microswitches responsive to the movements of a flexible blade in one or the other direction.

8 Claims, 11 Drawing Figures

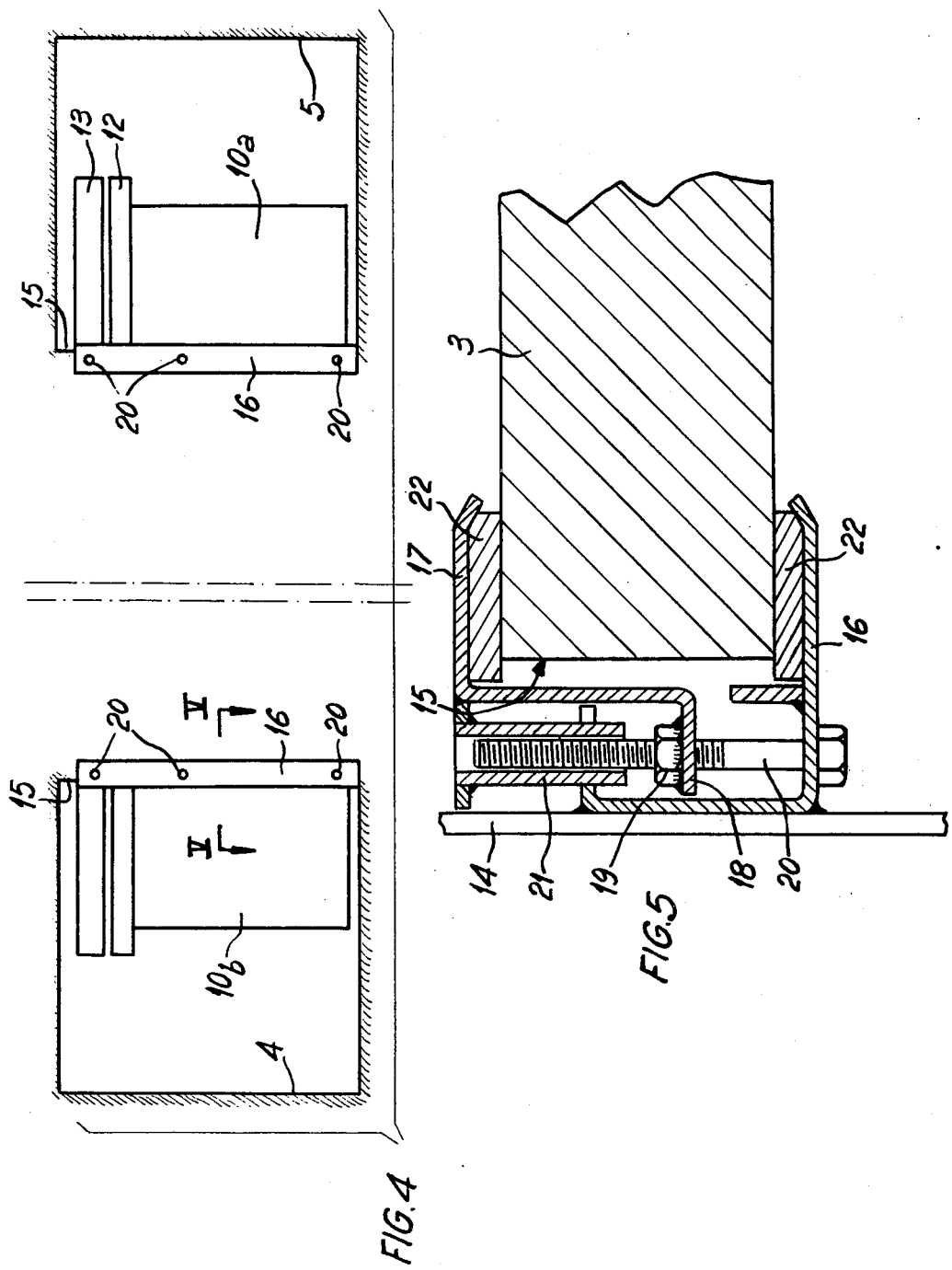

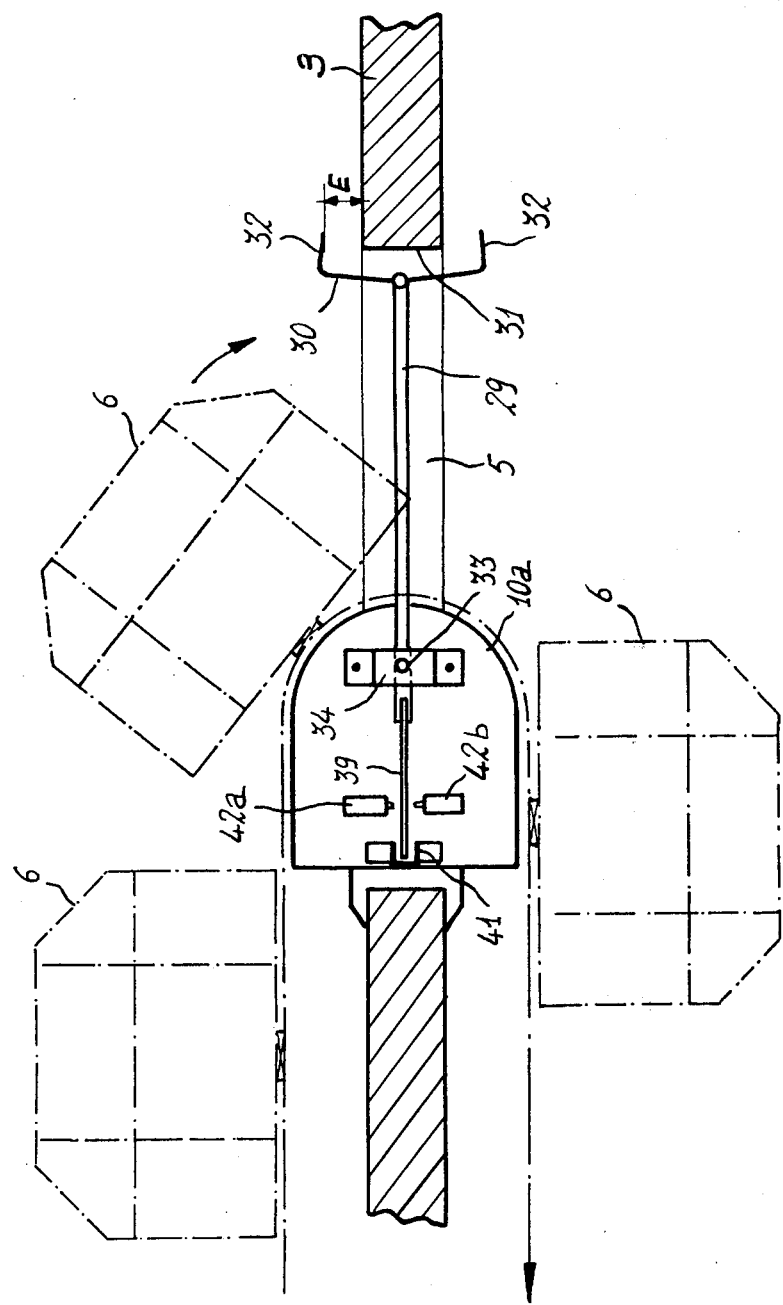

4,157,753

CONVEYOR PLANT

BACKGROUND OF THE INVENTION

1. Field of the Invention

The present invention relates to conveyor plants or the like, of the type intended for equipping both sides of a wall or partition in which two spaced apertures are formed to permit the free passage of the movable component elements of the conveyor plant.

2. Description of the Prior Art

Conveyor plants of the type broadly defined hereinabove may be used typically for example for solving the problem of removing trays loaded with soiled dishes, forks and spoons from certain public restaurants or companies' restaurants, more particularly restaurants wherein the users use trays for transporting the various vessels containing the food and drinks to be consumed. In this case, conveyors of the above-defined type may be fitted across a wall or partition separating the dining room of the restaurant from an adjacent cleaning and wash room. The movable elements of the conveyor equipping this wall, for example special gondolas or baskets, are thus caused to travel along a closed-loop path and move firstly past the wall surface on the dining room side and then past the opposite wall surface on the wash room side. Thus, the users of the restaurant may deposit on the movable transport elements of the conveyor the trays containing the soiled plates and dishes which can subsequently be recovered by the personnel in the wash room after said trays have been transported by the conveyor.

However, conveyors of this type may also be utilized for various different or similar applications, for example whenever it is desired to cater or supply a given room or space from another adjacent room or space. Conveyors of this type may also be installed in display rooms, shown windows or shops.

At present, conveyor plants of this type comprise a relatively cumbersome frame structure provided with floor-engaging elements such as legs, posts or the like. In certain cases, some sealing work has to be performed in the floor and/or the wall to be equipped with the conveyor. Besides, these known conveyor plants can only be installed by skilled hands.

DESCRIPTION OF THE INVENTION

It is therefore a primary object of the present invention to provide a conveyor plant, structure, arrangement or the like, of the type broadly set forth hereinabove, but designed with a view to permit its fixation directly on the wall or partition separating the two rooms to be interconnected thereby, this conveyor being free of any ground or floor-engaging element. On the other hand, this conveyor and its plant or installation are such that they can be transported to the site in the form of separate component elements adapted to be easily assembled on the site even by unskilled hands.

For this purpose, the present invention is characterized in that the driving mechanisms of the conveyor are assembled within two casings adapted to be mounted each in one of the two opposite or symmetrical spaced apertures formed in the wall, each casing being provided with jaws adapted to tightly clamp the vertical edge of the corresponding wall aperture which is nearest to the opposite aperture. Moreover, the arrangement comprises two longitudinal frame members adapted to be disposed on either side of the wall, the end portions of these longitudinal members being adapted to be secured to the corresponding casings disposed in said apertures.

Under these conditions, the component elements of the conveyor according to the present invention can be assembled and tightened on the site by means of simple screws and bolts. Besides, the overall size of the conveyor is reduced to a minimum.

However, other features and advantages of the present conveyor structure will appear as the following description proceeds with reference to the attached drawings showing diagrammatically by way of example typical forms of embodiment thereof.

BRIEF DESCRIPTION OF THE DRAWINGS

FIG. 4 is a view similar to FIG. 2 but showing the initial step of the mounting of the conveyor plant of this invention, namely the fastening of the pair of casings 10a, 10b at either end thereof;

FIG. 5 is a fragmentary section taken along the line V—V of FIG. 4 but on a different scale;

FIG. 8 is a section taken along the line VIII—VIII of FIG. 7;

DESCRIPTION OF THE PREFERRED EMBODIMENT

Figure 1:
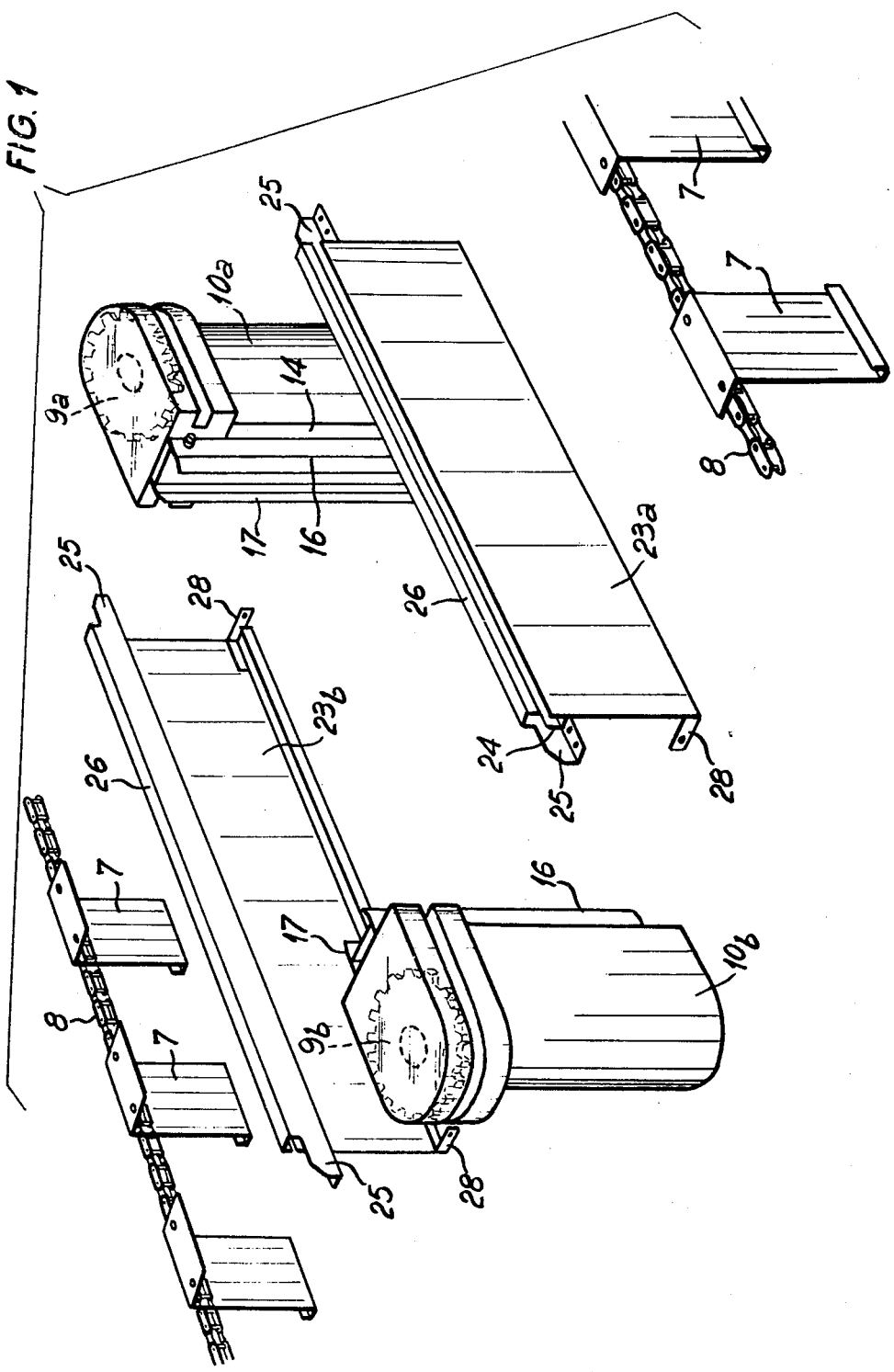
FIG. 1 is a perspective exploded view of the main component elements of the conveyor plant according to a first form of embodiment of this invention.
Figure 2:
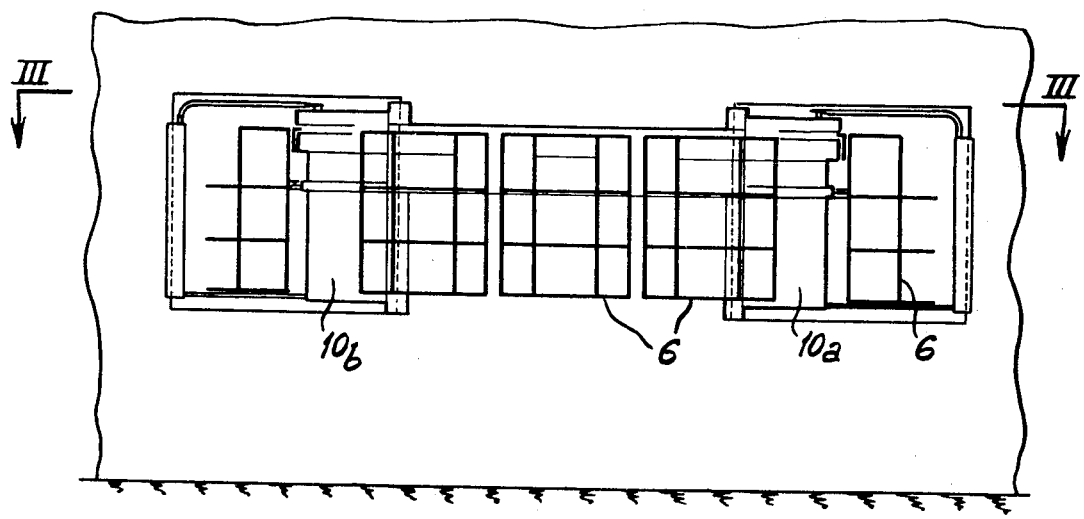
FIG. 2 is a fragmentary front elevational view showing on a smaller scale the conveyor equipping a wall or partition.

As already mentioned in the above preamble, the conveyor structure according to this invention is intended for mounting on the two opposite surfaces 1 and 2 of a wall or partition 3 comprising a pair of spaced apertures 4 and 5 for the passage of the movable carrier elements of the conveyor. These movable carrier elements may consist of gondolas or baskets 6 attached to and/or suspended from a plurality of spaced supports 7 secured to an endless driving chain 8. This chain 8 engages guide sprockets 9a and 9b located at the opposite ends of the conveyor, respectively, and comprises two reaches moving the one adjacent one surface 1 and the other adjacent the opposite surface 2 of wall 3. The gondolas or baskets 6 are thus caused to travel by turns along the two wall surfaces after passing through the end apertures 4 and 5.

Figure 6:
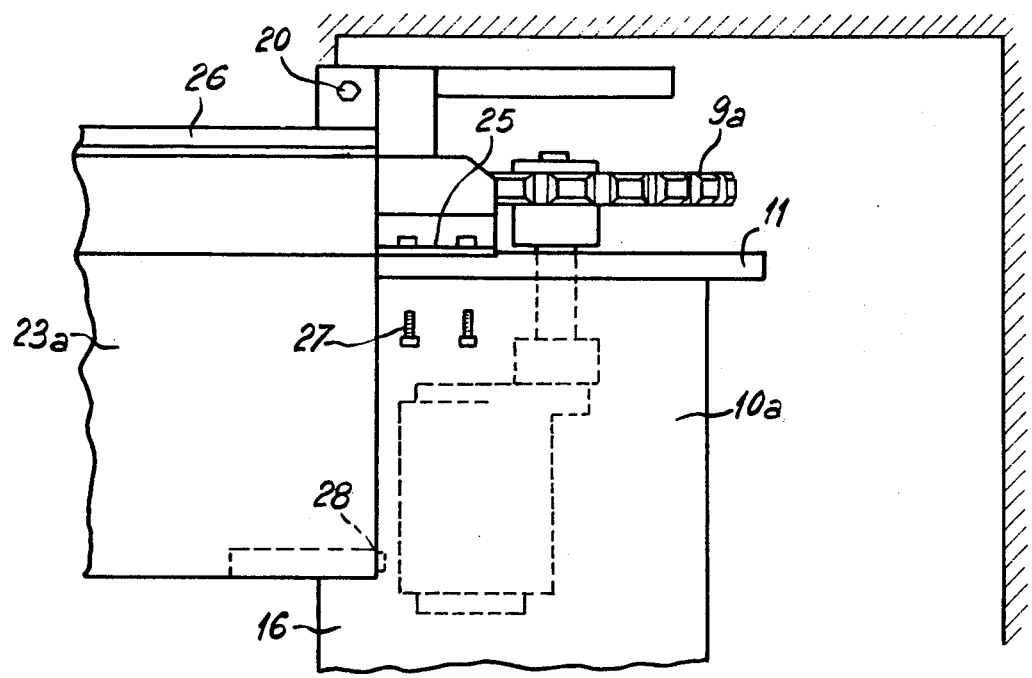
FIG. 6 is a fragmentary front elevational view of one of the end casings, this view illustrating the mode of fixation of one of the longitudinal members of the frame structure.
Figure 7:
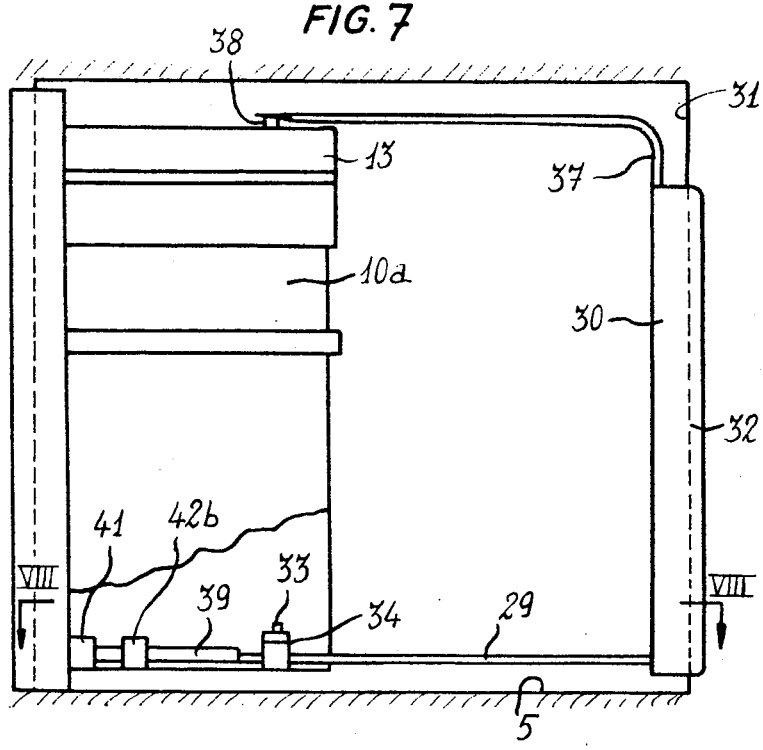
FIG. 7 shows in front elevational view one of the end casings and the safety device associated therewith at the location of the passage contemplated through the corresponding wall.
Figure 11:
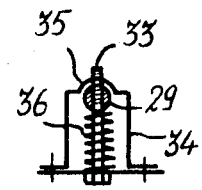
FIG. 11 is a fragmentary section taken along the line XI—XI of FIG. 9.
Figure 9:
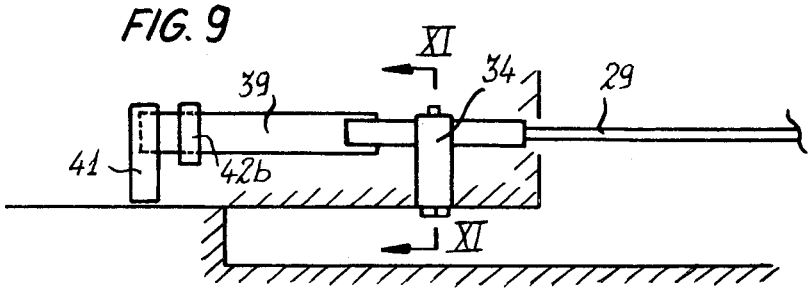
FIG. 9 is a fragmentary front elevational view showing on a different scale the safety device equipping the conveyor structure of FIGS. 7 and 8.
Figure 10:
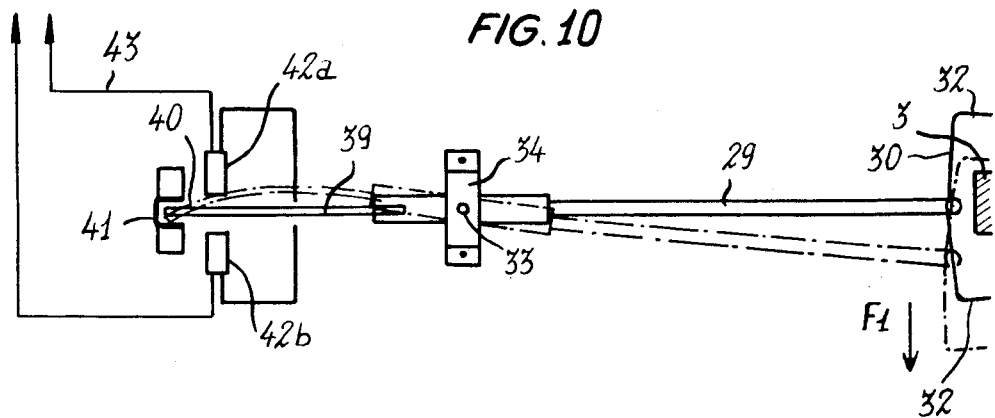
FIG. 10 is a diagrammatic plane view from above thereof.

According to an essential feature characterizing this conveyor arrangement, the driving mechanisms thereof are enclosed in two casings 10a and 10b adapted to be fitted within the apertures 4 and 5 of the wall or partition 3. These casings enclose the above-mentioned sprockets 9a and 9b keyed or otherwise fastened to relevant vertical shafts mounted in suitable bearings adequately disposed inside the corresponding casings. Moreover, enclosed in one of the casings, for example casing 10a, is an electric motor (shown in dash lines in FIG. 6) driving the corresponding sprocket 9a constituting the driving sprocket of the conveyor.

The pair of sprockets 9a, 9b disposed above a top plate 11 closing the upper portion of each casing 10a, 10b are concealed by a separate or detachable arcuate strip 12 having a cover 13 detachably secured on its top.

Figure 3:
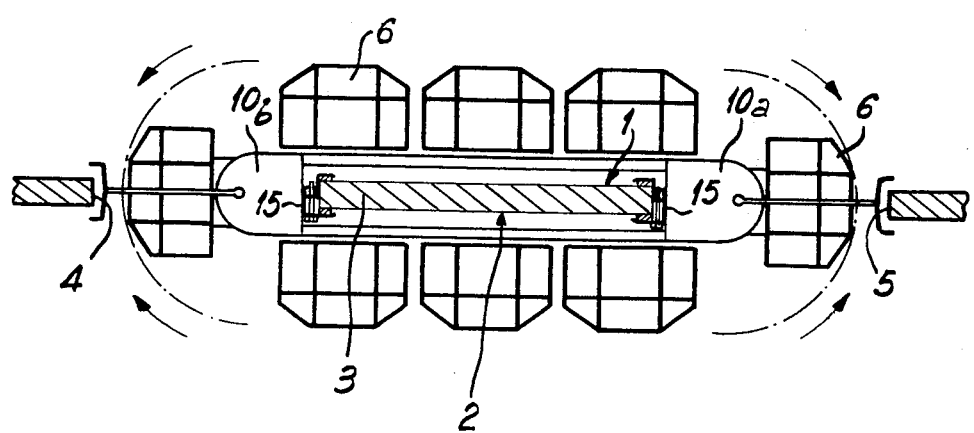
FIG. 3 is a section taken along the line III—III of FIG. 2.

Each casing 10a, 10b comprises a flat vertical surface 14 adapted to register with the vertical edge of the relevant aperture 4 or 5 of wall 1 which is the edge nearest to the opposite aperture (see FIG. 3). Along this vertical surface 14 each casing 10a, 10b comprises a pair of clamping jaws adapted to be tightened against the corresponding edge of the aperture.

As illustrated in FIG. 5, one of the pair of clamping jaws consists of an angle-iron 16 secured by welding to the surface 14 of the corresponding casing. The other jaw 17 is movable and consists of a section member having a substantially Z shape in cross section. One wing of this section constitutes the clamping jaw proper and its opposite wing 18 carries a nut 19 engaged by a lock or tightening screw 20. The head of screw 20 bears against the outer surface of the fixed jaw 16 and the screw shank slidably engages a guide sprocket 21 rigid with the movable jaw 17.

Thus, after disposing the pair of jaws 16 and 17 on either side of the corresponding edge of the wall aperture, the operator simply tightens the screws 20 for clamping the jaws. Preferably, the inner surfaces of both jaws 16 and 17 are lined with a pad or strip 22 of resilient or compressible material.

In combination with the opposite casings 10a and 10b the present conveyor arrangement comprises a pair of longitudinal frame members designated in general by the reference symbols 23a and 23b. Each longitudinal member consists of a metal plate or a sheet of other suitable material having a length corresponding to the distance measured between the adjacent edges of the opposite apertures 4 and 5. Along their upper edges, these plate 23a and 23b comprise a slideway 24 adapted to guide the relevant reach of the driving chain 8.

At its upper corners each plate 23a, 23b carries an assembling square or iron knee 25 consisting if desired of a suitably shaped extension of a U-section member 26 overlying the corresponding slideway 24. This square or iron knee 25 is adapted to be secured by means of bolts 27 to the top plates 11 of the opposite casings 10a and 10b. Moreover, at their lower corners these plates 23a and 23b comprise inturned lugs 28 also adapted to be secured by bolting to the corresponding casing.

With the arrangement described hereinabove the conveyor plant or frame structure comprises essentially four main component elements, i.e., the casings 10a, 10b and the longitudinal plates 23a, 23b. Thus, the assembly can easily be transported in its disassembled condition to the site. On the other hand, the driving chain 8 consists of two reaches corresponding to one and the other side of the conveyor, and this chain can be assembled on the site by means of coupling links. Of course, the carrier or transport gondolas or baskets are also adapted to be easily disassembled.

When assembling the present conveyor on the site, the casings 10a and 10b are firstly secured in position by means of their jaws, as illustrated in FIG. 4. For this purpose, the casings are disposed inside the relevant apertures 4 and 5 formed through the wall or partition 3, and each casing is moved towards the edge 15 of the corresponding aperture, i.e., the edge nearest to the opposite aperture. During this operation, the jaws 16 and 17 are engaged on either side of the corresponding edge 15 and the casings 10a, 10b are eventually fastened thereto by tightening the two pairs of jaws by means of screws 20. Thus, both casings 10a and 10b are reliably secured in position.

Then, the pair of longitudinal plates 23a and 23b are positioned against the opposite wall surfaces 1, 2 and their ends are secured to the casings 10a and 10b by means of angles 25 and lugs 28.

Subsequently, the pair of complementary reaches of drive chain 8 are inserted into the slideways 24 and passed around the sprockets 9a and 9b, and the two chain reaches are assembled by means of conventional coupling links provided for this purpose. Finally, the gondolas or baskets required for transporting the articles from one side to the other side of the wall 3 are attached to the various supports 7.

From the foregoing it is clear that this conveyor can be assembled and rendered operative very easily and rapidly, without resorting to skilled hands. Moreover, this conveyor is perfectly held in position, notwithstanding the absence of any sealings in, or base plates bearing on, the floor. Besides, this construction is also advantageous in that its overall dimensions are minimized considerably.

As mentioned in the foregoing, a typical application of this conveyor consists in installing same in a self-service restaurant or the like in order to facilitate the recovery of trays containing soiled forks and spoons and dishes. In this case the conveyor plant according to the instant invention is utilized for conveying these articles into a cleaning and wash room adjacent the corresponding dining room. However, it will readily occur to the reader that the same conveyor or a conveyor constructed according to the basic principles of the present invention may lend itself to many other applications. Besides, the conveyor plant or structure according to this invention may if desired be utilized not for transporting but for displaying such articles or miscellaneous products in a shown window, in order to attract the attention of passers-by. The same device may also be utilized for advertising or other purposes.

Of course, this invention should not be construed as being strictly limited by the specific form of embodiment described hereinabove with reference to the attached drawings. Besides, its component elements may be embodied with various modifications and changes, notably as a function of specific cases and applications, while remaining within the scope of the invention.

Preferably, the conveyor system of this invention comprises a safety device adapted to stop the operation thereof instantaneously in case anybody introduced a hand or any other body part through one of the wall apertures 4 and 5 with the risk of having the hand or other body part jammed by one of the movable component elements or carrier gondolas or baskets of the conveyor.

This safety device comprises an actuator rod 29 extending horizontally along the bottom edge of the aperture in which the device is mounted, for example aperture 5 as shown by way of example in FIGS. 7 to 11. The end of this actuator rod which is opposite the conveyor carries a control element 30 extending along the outer vertical edge 31 of aperture 5, i.e., parallel to the edge 15 to which the corresponding casing 10a is secured. The control element 30 is a section member having a substantially U-shaped cross sectional contour. The two lateral wings 32 of this section member extend on either side of the corresponding edge 31 of aperture 5; however, a relatively substantial clearance E is left between said wings 32 and the registering surfaces of the wall.

The other end of actuator rod 29 is adapted to pivot about a vertical pin 33 trunnioned in a fixed bridge piece 34 disposed astride said rod. However, the upper transverse portion of this bridge piece 34 has a semi-circular sectioned rib 35 formed therein so as to form an internal groove in which the rod 29 is partly held on account of the resilient force exerted thereon by a coil spring 36 provided for this purpose. Under these conditions, the spring 36 urges the rod 29 to the position in which it engages said groove. Now, this groove lies in the vertical median plane of the wall, so that the rod 29 is normally retained in the position illustrated in FIG. 8.

Preferably, this actuator rod 29 consists of one of the side arms of a bow 37 (FIG. 7) of which the central element is rigid with the U-sectioned control member 30. The other horizontal arm of this bow 37 has its end opposite said control member pivotally mounted on a vertical pin 38 carried by the cover 13 of the corresponding casing 10a (or 10b) of the conveyor frame structure which encloses the aforesaid bridge piece 34 in its lower portion.

Beyond this bridge piece 34 the adjacent end of actuator rod 29 is secured to one end of a flexible blade 39 having its opposite end 40 engaged in a blind hole or cavity formed in a fixed member 41 adapted to act as an abutment to said blade end 40, in one or the other direction and in a horizontal plane. On either side of this end 40 a pair of very sensitive electric microswitches 42a and 42b are disposed and connected electrically in series with an electric circuit 43 controlling the energization of the motor driving the corresponding mechanism, i.e., the sprockets driving in turn the endless chain supporting the carrier gondolas or baskets 6.

This safety device operates as follows:

When a person engages either inadvertently or on purpose a hand or any other portion of his or her body through an aperture 4 or 5 formed in the wall 1 while one of the transport gondolas or baskets 6 is turning around the corresponding casing 10a or 10b, the hand or other body portion carried along quite naturally by the passing gondola or basket will depress laterally the control member 30, thus causing the actuator rod 29 to pivot in the direction of the arrow F1. This movement is attended by an elastic distortion of blade 39, as shown in dash and dot lines in FIG. 10. Thus, the blade 39 will engage and actuate one of the microswitches, in this case microswitch 42a, and the ensuing immediate deenergization of the driving motor will stop the conveyor instantaneously.

It will be seen that the actuator rod 29 is considerably longer than resilient blade 39. In fact, this control rod may have twice the length of the flexible blade 39. Therefore, even a very slight pressure exerted on control member 30 will change the shape of resilient blade 39 sufficiently for causing its tip 40 to actuate one or the other of microswitches 42a, 42b. However, due to the fact that the tip 40 of blade 39 is retained in a cavity 41, the application of any unduly high pressure to the microswitches is safely avoided. Besides, to obtain a very high operating sensitivity of this safety device, extremely sensitive microswitches, i.e., not capable of withstanding relatively high pressures, must be used.

On the other hand, it will be seen that the operation of one or the other microswitch is obtained well before the control member 30 of the safety device has completed its permissible stroke, that is, in a position such that one of its lateral wings 32 abuts the registering surface of wall 3. This greatly facilitates the withdrawal or release of the body part previously engaged into the gap left between the gondola or basket 6 and the outer vertical side of the corresponding aperture 4 or 5.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A conveyor plant having a conveyor including movable elements for equipping the two surfaces of a wall having two apertures for the passage of the movable elements of the conveyor, said plant comprising in combination movable transport means; means for driving said transport means; two casings enclosing said driving means and adapted to be disposed in one and the other of said apertures of said wall, respectively; on each side of said casings, jaw means adapted to engage the vertical edge of the corresponding wall aperture which is adjacent to the other aperture, and to be tightly clamped against said edge, and a pair of longitudinal frame members each having two ends and being adapted to be disposed against a respective surface of said wall, the ends of each frame member being adapted to be secured to the relevant casing when said casings are disposed in the corresponding apertures.

2. A conveyor plant as set forth in claim 1, wherein said jaw means comprising pairs of jaws and the two casings each comprise a vertical flat surface to which said clamping jaws are secured, one jaw of each pair being movable and the other jaw being a registering jaw which is fixed and rigid with said vertical surface.

3. A conveyor plant as set forth in claim 2, which comprises a driving chain forming a closed loop and to which said movable transport means are secured, each casing carrying at its upper portion a guide sprocket adapted to receive said driving chain, said sprocket being concealed by by a detachable strip on which a detachable cover is adapted to be fitted.

4. A conveyor plant as set forth in claim 3, wherein said longitudinal frame members comprise a pair of plates of a length equal to the distance between the apertures formed through the wall, each plate having an upper edge carrying a slideway adapted to receive and guide one reach of said driving chain.

5. In a conveyor plant as set forth in claim 1, a safety device associated with each casing and comprising a control member adapted to be disposed along one edge of the relevant aperture formed in said wall and be actuated by one portion of the body of a person which might protrude within said aperture, said control member having an end carrying an actuator rod rigid with one end of a flexible blade having another end restricted to limited movement, a pair of electric switches being disposed on either side of said other end of said blade for controlling the shut-down of the corresponding plant.

6. A safety device for a conveyor plant as set forth in claim 5, wherein said actuator rod consists of a pivoted lever normally urged by a spring to an inoperative position in which it engages a groove formed in an upper transverse portion of a bridge piece disposed astride said rod and supporting a pivot pin thereof.

7. A safety device for a conveyor plant as set forth in claim 5, wherein said other end of said flexible blade engages a cavity adapted to act as an abutment thereto during the elastic deformation of said blade in one or the other direction.

8. A safety device as set forth in claim 5, wherein said actuator rod consists of one of two side arms of a bow-shaped member having its median section rigidly secured to a movable vertical U-sectioned control member having side wings parallel to, and disposed on either side of, another vertical edge of the relevant aperture opposite the associated casing, and having an intermediate portion rigidly secured to said median section of said bow-shaped member, the latter having its other side arm, pivoted about a pin aligned with a pivot pin of said actuator rod.

* * * * *